United States Patent
Hirano et al.

(10) Patent No.: US 7,822,393 B2
(45) Date of Patent: Oct. 26, 2010

(54) TRANSMISSION APPARATUS AND COMMUNICATION APPARATUS

(75) Inventors: Shunsuke Hirano, Kanagawa (JP); Takahito Miyazaki, Kyoto (JP)

(73) Assignee: Panasonic Corporation, Osaka (JP)

(*) Notice: Subject to any disclaimer, the term of this patent is extended or adjusted under 35 U.S.C. 154(b) by 555 days.

(21) Appl. No.: 11/963,924

(22) Filed: Dec. 24, 2007

(65) Prior Publication Data

US 2008/0153435 A1 Jun. 26, 2008

(30) Foreign Application Priority Data

Dec. 26, 2006 (JP) ............... 2006-349807

(51) Int. Cl.
*H04B 1/02* (2006.01)
(52) U.S. Cl. ............ 455/108; 455/110; 455/127.1; 375/297; 330/295
(58) Field of Classification Search ............ 455/91, 455/108, 110, 115.1, 115.3, 127.1, 127.2; 375/297, 300, 302; 330/10, 51, 136, 207 A, 330/251, 295, 297
See application file for complete search history.

(56) References Cited

U.S. PATENT DOCUMENTS

| | | | |
|---|---|---|---|
| 6,313,698 B1 | 11/2001 | Zhang | |
| 6,636,114 B2 * | 10/2003 | Tsutsui et al. | 330/51 |
| 6,853,244 B2 | 2/2005 | Robinson | |
| 7,010,276 B2 | 3/2006 | Sander | |
| 7,082,290 B2 * | 7/2006 | Takano et al. | 375/300 |
| 7,457,592 B2 * | 11/2008 | Arayashiki | 455/108 |
| 2002/0177420 A1 | 11/2002 | Sander | |
| 2007/0211820 A1 | 9/2007 | Hara | |

FOREIGN PATENT DOCUMENTS

| | | |
|---|---|---|
| JP | 2003/510882 | 3/2003 |
| JP | 2003/304127 | 10/2003 |
| JP | 2005/020694 | 1/2005 |
| JP | 2005/509320 | 4/2005 |
| WO | 2006/082894 | 8/2006 |

OTHER PUBLICATIONS

International Search Report Dated Feb. 12, 2008.

* cited by examiner

*Primary Examiner*—Quochien B Vuong
(74) *Attorney, Agent, or Firm*—Dickinson Wright PLLC

(57) ABSTRACT

The transmission apparatus according to the present invention can reduce transmission output noise leaking into the receiving apparatus even when the transmission apparatus is applied to wireless equipment using the W-CDMA scheme. Transmission apparatus (100) has bypass circuit (101) and bypass control circuit (103) that inputs an RF phase signal to power amplifier (14) via amplitude adjustment circuit (16) when bypass circuit (101) and power amplifier (14) are operated in non-saturation mode, and that inputs the RF phase signal to power amplifier (14) via bypass circuit (101) when power amplifier (14) is operated in saturation mode.

9 Claims, 8 Drawing Sheets

TRANSMISSION APPARATUS AND COMMUNICATION APPARATUS

CROSS REFERENCE TO RELATED APPLICATIONS

The disclosure of Japanese Patent Application No. 2006-349807, filed on Dec. 26, 2006, including the specification, drawings and abstract, is incorporated herein by reference in its entirety.

BACKGROUND OF THE INVENTION

1. Field of the Invention

The present invention relates to a transmission apparatus and communication apparatus having a power amplifier in which the operation mode is switched between saturation mode and non-saturation mode, and is suitable to a transmission apparatus and communication apparatus used in radio communication schemes including the W-CDMA (Wideband Code Division Multiple Access) scheme.

2. Description of the Related Art

Up till now, a transmission apparatus has been known in which current consumption can be reduced by operating the power amplifier in saturation mode provided in the tail of a transmission system. As a typical example, a polar modulation transmission apparatus has been proposed. The polar modulation transmission apparatus is disclosed in, for example, Patent Document 1 (U.S. Patent Application Laid-Open No. 2002/0177420).

FIG. 1 illustrates a schematic configuration of the polar modulation transmission apparatus disclosed in Patent Document 1. Here, the polar modulation technique is widely known and explanations thereof will be performed simply using FIG. 1. In the transmission apparatus of FIG. 1, transmission data is inputted to amplitude signal and phase signal forming section 11 and amplitude signal and phase signal forming section 11 forms an amplitude signal and phase signal according to transmission data.

Mixer 12 amplifies the amplitude signal according to the scaling coefficient from power control section 13. This amplified amplitude signal is supplied to the power supply terminal of power amplifier 14 as power supply voltage $V_{am}$ of power amplifier 14. On the other hand, phase modulation section 15 performs up-conversion on the phase signal and acquires an RF phase signal. Here, phase modulation section 15 employs a configuration having a VCO (Voltage Controlled Oscillator) and PLL (Phase Locked Loop).

Amplitude adjustment circuit 16 adjusts the amplitude of the RF phase signal according to the scaling coefficient from power control section 13, and subsequently inputs the adjusted amplitude to the signal input terminal of power amplifier 14. Here, amplitude adjusting section 16 employs a configuration having an attenuator and VGA (Variable Gain Amplifier).

By this means, the apparatus in FIG. 1 combines the amplitude signal and the RF phase signal in power amplifier 14 and transmits the combined signal from an antenna (not shown).

By the way, according to the standard of transmission power control, a mobile phone employing the W-CDMA scheme needs to maintain the dynamic range of 74 dB with respect to the transmission power of the output signal outputted from power amplifier 14. To maintain such a wide dynamic range, the transmission apparatus shown in FIG. 1 is known to be provided such that the operation mode of power amplifier 14 is switched between saturation mode and non-saturation mode.

The operation of each mode will be explained using FIG. 2. The long and short dotted line in the figure shows the switching point between operation modes. When transmission power $P_{out}$ is high, the operation is performed in saturation mode. In saturation mode, the transmission apparatus changes transmission power $P_{out}$ by changing the level of power supply voltage $V_{am}$. Control of $V_{am}$ alone does not make it possible to perform power control in a wide dynamic range of 74 dB, and, consequently, when transmission power $P_{out}$ becomes smaller, the operation is performed in non-saturation mode. In non-saturation mode, the transmission apparatus changes the level of transmission power $P_{out}$ by fixing the level of power supply voltage $V_{am}$ and changing the level of power of RF phase modulation signal $P_{pm}$. Thus, the mode that changes transmission power $P_{out}$ by changing power supply voltage $V_{am}$ of power amplifier 14 is referred to as the "saturation mode," and the mode that changes transmission power $P_{out}$ by changing input signal power $P_{pm}$ of power amplifier 14 is referred to as the "non-saturation mode." The transmission apparatus maintains the dynamic range of 74 dB by combining these two modes.

However, the W-CDMA scheme performs simultaneous transmission and reception, and, in a mobile phone terminal employing the W-CDMA scheme, there is a problem of transmission output noise in the receiving band leaking into the receiving input terminal. Actually, when the transmission apparatus in FIG. 1 is mounted in a mobile phone terminal, the output terminal of the power amplifier is connected to an antenna via an antenna duplexer. Here, the input terminal of the receiving apparatus, in addition to the output terminal of the power amplifier, is also connected to this antenna duplexer. When this configuration is employed, there is a problem that transmission output noise, caused by the transmission apparatus, leaks into the receiving apparatus via the antenna duplexer.

Therefore, transmission output noise in the receiving band needs to be reduced to an extent where reception sensitivity is not degraded. To reduce noise from the output signal in FIG. 1, amplitude adjustment section 16 needs to be configured such that good noise characteristics are yielded.

For example, although amplitude adjustment section 16 may be comprised of a variable attenuator, when the variable attenuator is comprised of an active circuit such as a differential gain control amplifier, there is a problem of increased power consumption for yielding good noise characteristics. As another method, although the variable attenuator may be comprised of a passive circuit such as a π type resistance attenuator, in this case, there is a problem of increased power loss in the variable attenuator. Further, in the above-described cases, there is a problem that an excellent C/N (Carrier to Noise) ratio of the RF phase signal is degraded by the variable attenuator.

SUMMARY OF THE INVENTION

It is therefore an object of the present invention to provide a transmission apparatus and communication apparatus capable of reducing transmission output noise leaking into the receiving apparatus even when the transmission apparatus and the communication apparatus are applied to wireless equipment using the W-CDMA scheme.

According to the present invention, a transmission apparatus, which has a power amplifier that amplifies power of a transmission signal and capable of switching an operation mode of the power amplifier between saturation mode and non-saturation mode, employs a configuration having: a power supply voltage adjustment circuit that controls power supply voltage supplied to the power amplifier; an input signal amplitude adjustment circuit that inputs to a signal input terminal of the power amplifier a first input signal comprising an input signal subjected to amplitude adjustment; a bypass circuit that inputs to the signal input terminal of the power amplifier a second input signal bypassing the input signal amplitude adjustment circuit; and a bypass control circuit that switches an input for the power amplifier, wherein the bypass control circuit inputs the first input signal to the power amplifier when the power amplifier is operated in the non-saturation mode and inputs the secant input signal to the power amplifier when the power amplifier is operated in the saturation mode.

DETAILED DESCRIPTION OF THE PREFERRED EMBODIMENT

Embodiments of the present invention will be explained below in detail with reference to the accompanying drawings.

Embodiment 1

Figure 1:
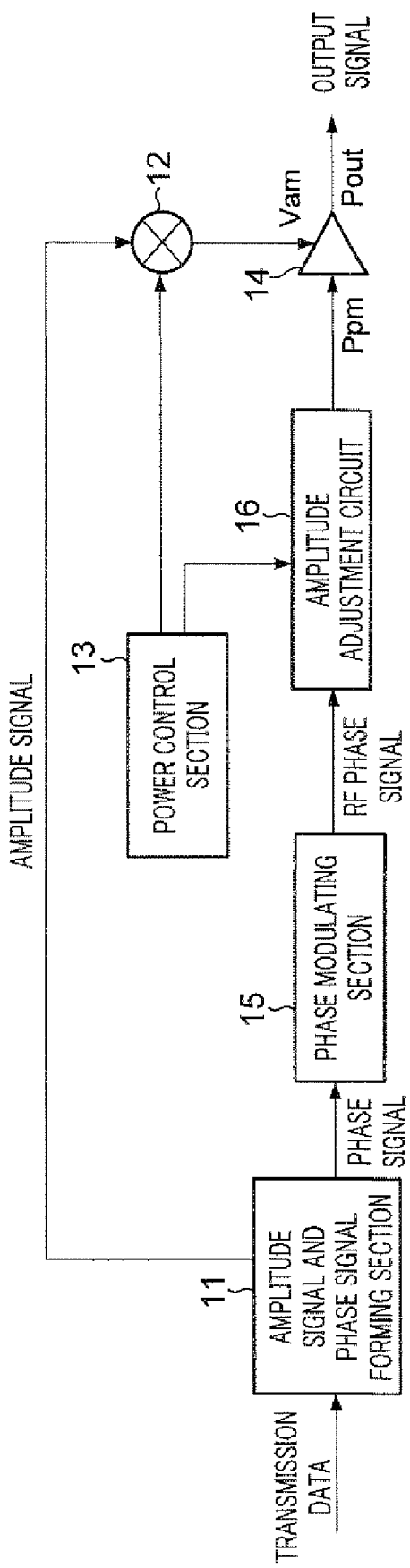
FIG. 1 is a block diagram showing a configuration of a transmission apparatus of related art.
Figure 2:
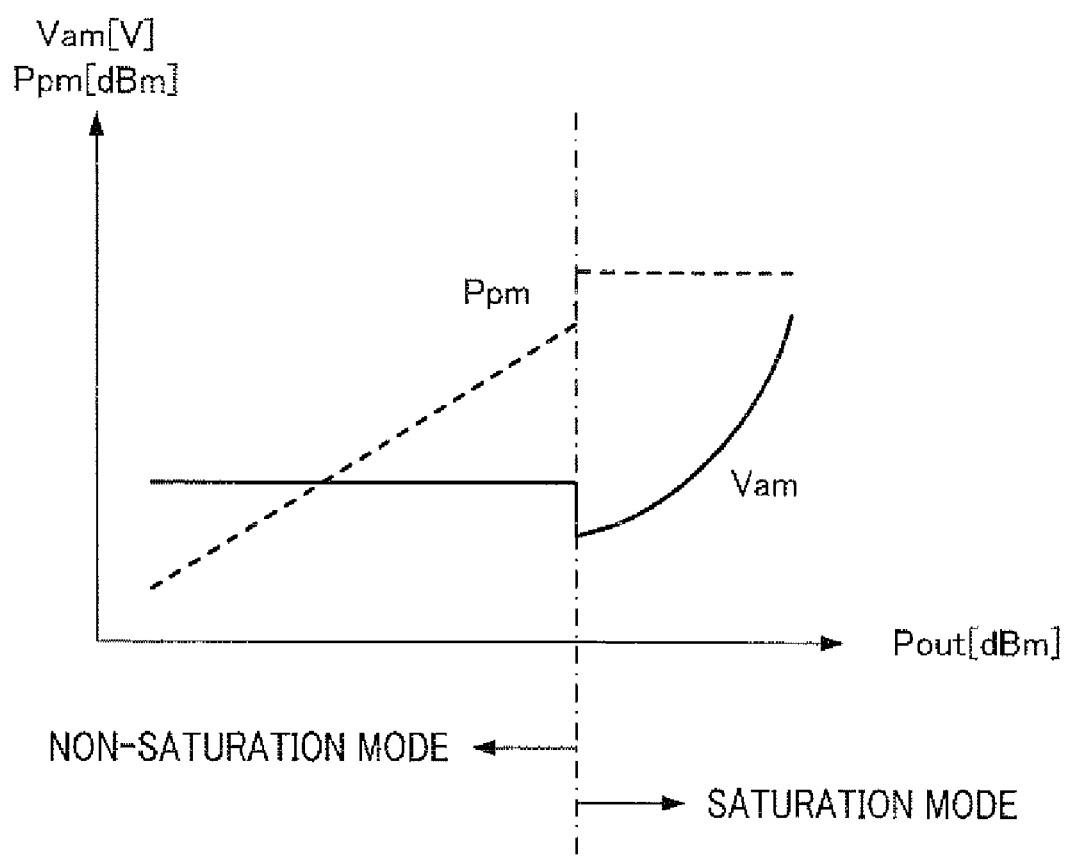
FIG. 2 illustrates saturation mode and non-saturation mode for explanation.
Figure 3:
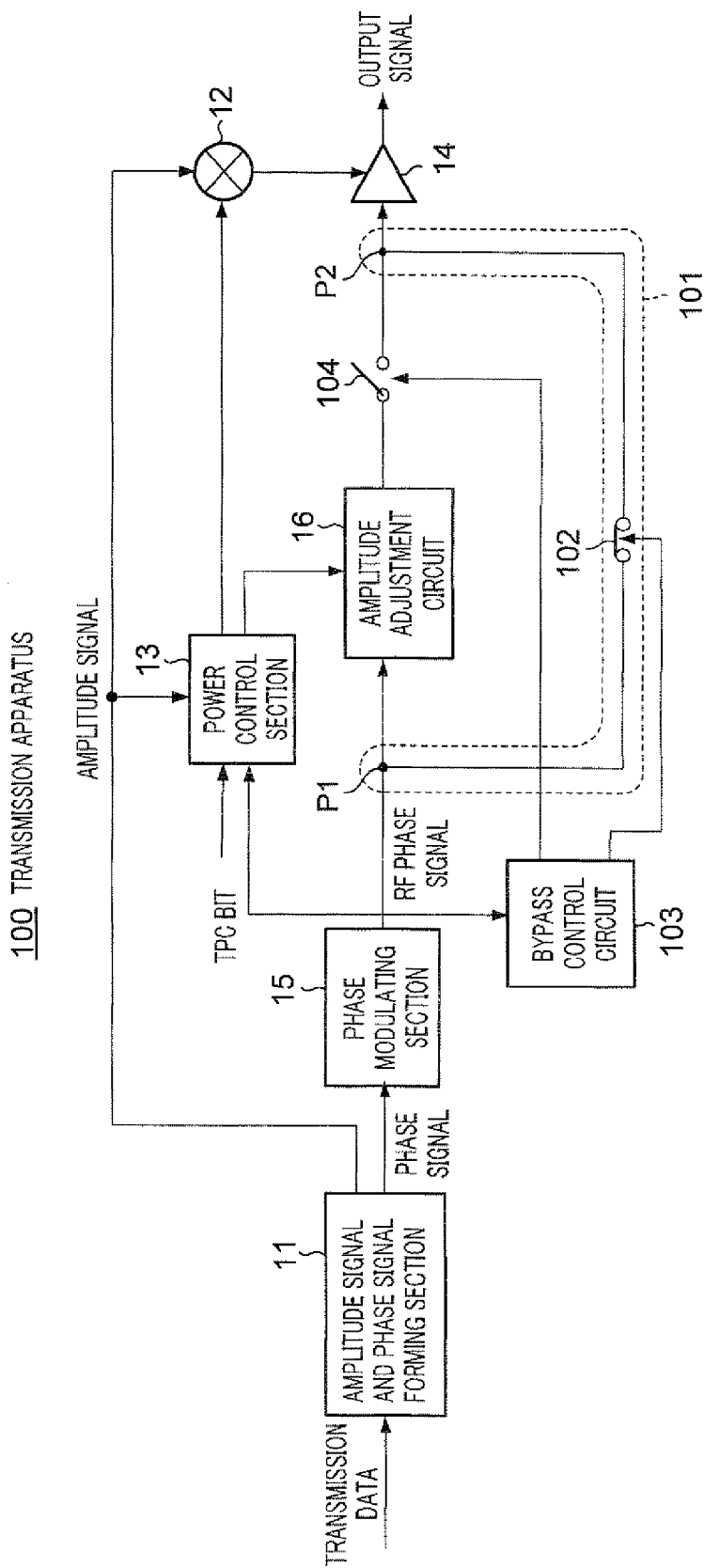
FIG. 3 is a block diagram showing a configuration of a transmission apparatus according to Embodiment 1 of the present invention.

FIG. 3 illustrates the configuration of the transmission apparatus according to Embodiment 1 of the present invention. Here, the same components as in FIG. 1 are assigned the same reference numerals. FIG. 3 is different from FIG. 1 in that transmission apparatus 100 further has bypass circuit 101 and bypass control circuit 103 and an amplitude signal is inputted to power control section 103. Here, transmission apparatus 100 is commonly referred to as a "polar modulation transmission apparatus."

In transmission apparatus 100, transmission data is inputted to amplitude signal and phase signal forming section 11, which forms an amplitude signal and phase signal according to transmission data.

Mixer 12 amplifies this amplitude signal according to the scaling coefficient from power control section 13. The amplified amplitude signal is supplied to the power supply terminal of power amplifier 14 as the power supply voltage of power amplifier 14. On the other hand, phase modulation section 15 generates an RF phase signal by performing up-conversion on the phase signal. Here, phase modulation section 15 employs a configuration having a VCO and PLL circuit.

Amplitude adjustment circuit 16 adjusts the amplitude of the RF phase signal according to the scaling coefficient from power control section 13, and sequentially inputs the adjusted RF phase signal to the signal input terminal of power amplifier 14. Here, amplitude adjustment circuit 16 is comprised of, for example, an attenuator and VGA.

By this means, transmission apparatus 100 combines the amplitude signal and the RF phase signal in power amplifier 14 and transmits the combined signal from an antenna (not shown).

Here, power control section 13 determines the scaling coefficient to be transmitted to mixer 12 and the scaling coefficient to be transmitted to amplitude adjustment circuit 16 based on the TPC (Transmit Power Control) bit transmitted from the transmission destination (for example, the base station). Here, the TPC bit is acquired from the receiving apparatus in the communication apparatus mounting the transmission apparatus. The schematic configuration of the communication apparatus will be described later using FIG. 4.

In addition to the above-described configuration, transmission apparatus 100 has bypass circuit 101. Bypass circuit 101 is provided so that the RF phase signal is supplied to the signal input terminal of power amplifier 14 bypassing amplitude adjustment circuit 16 (that is, without passing through amplitude adjustment circuit 16). This bypass circuit 101 electrically connects connection point 1 provided on the signal line between phase modulation section 15 and amplitude adjustment circuit 16, to connection point 2 provided on the signal line between amplitude adjustment circuit 16 and power amplifier 14. Further, bypass circuit 101 has switch 102.

Further, on the signal line connecting amplitude adjustment circuit 16 and power amplifier 14, transmission apparatus 100 provides switch 104 closer to amplitude adjustment circuit 16 than connection point P2 of bypass circuit 101.

Further, transmission apparatus 100 has bypass control circuit 103. Bypass control circuit 103 controls switches 102 and 104 on and off according to transmission power inputted from power control section 13.

Actually, when the transmission power value inputted from power control section 103 is less than a given threshold and the power amplifier is decided to be operated in non-saturation mode, bypass control circuit 103 controls switch 104 on and switch 102 off. By this means, the RF phase signal is inputted to amplitude adjustment circuit 16, and the RF phase signal subjected to amplitude adjustment is inputted to the signal input terminal of power amplifier 14. In this case, the power supply voltage of power amplifier 14 is fixed by power control section 13.

By contrast, when the transmission power value inputted from power control section 103 is equal to or greater than a given threshold and the power amplifier is decided to be operated in saturation mode, bypass control circuit 203 controls switch 104 off and switch 102 off. By this means, the RF phase signal passes through bypass circuit 101 without entering amplitude adjustment circuit 16, and the RF phase signal with a fixed level is inputted to the signal input terminal of power amplifier 14. Further, in this case, the power supply voltage of power amplifier 14 is made variable by power control section 13.

Figure 4:
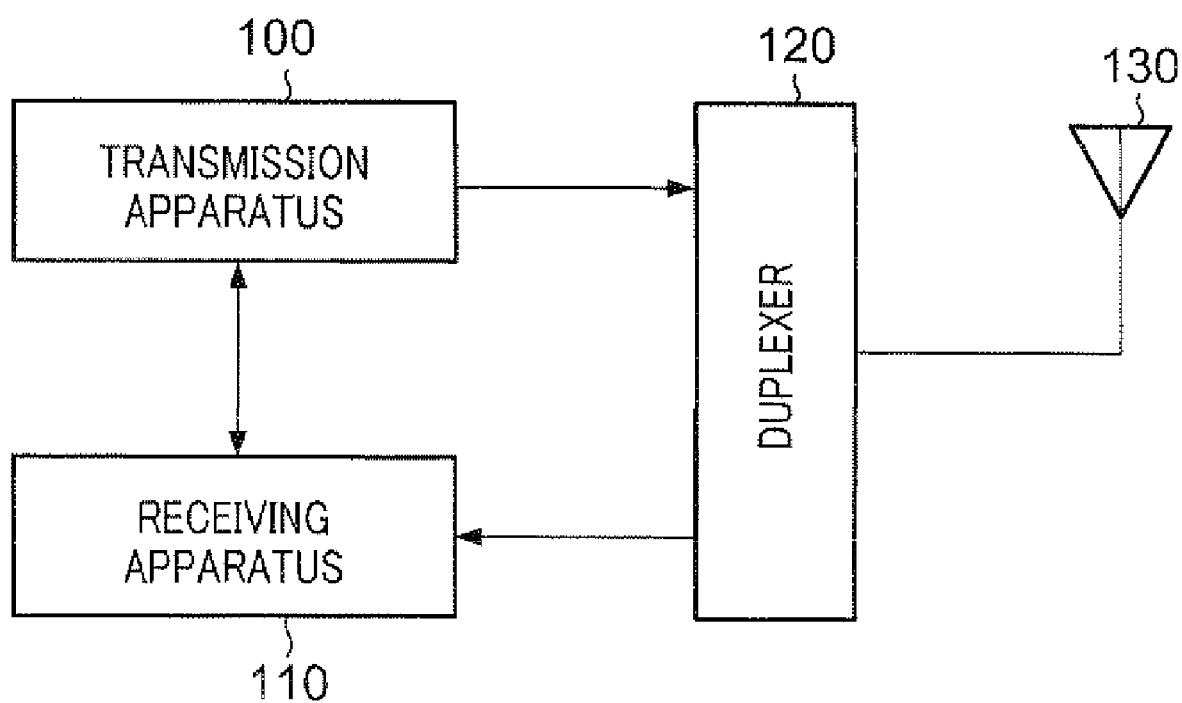
FIG. 4 is a block diagram showing a configuration of a communication apparatus according to Embodiment 1.

FIG. 4 illustrates the configuration of communication apparatus 200 mounting transmission apparatus 100. Communication apparatus 200 is, for example, a mobile phone apparatus and is configured such that communication is performed in the W-CDMA scheme. Communication apparatus 200 has transmission apparatus 100 of FIG. 3, receiving apparatus 110, duplexer 120 and antenna 130. The output signal from power amplifier 14 of transmission apparatus 100 is transmitted from antenna 130 via duplexer 120. Further, the signal received by antenna 130 is inputted to receiving apparatus 110 via duplexer 120 and applied to given reception processing such as demodulation processing in receiving apparatus 110. In this case, the TPC bit transmitted from the transmission destination (for example, the base station) is demodulated in receiving apparatus 110 and transmitted to power control section 13 of transmission apparatus 100.

Next, the operations of transmission apparatus 100 and communication apparatus 200 of the present embodiment will be explained below.

To maintain a wide dynamic range required in the W-CDMA scheme, transmission apparatus 100 switches between saturation mode and non-saturation mode according to transmission power. Actually, transmission apparatus 100 switches between saturation mode and non-saturation mode according to the scaling coefficient transmitted from power control section 13 to mixer 12 and amplitude adjustment circuit 16, and the switching control by bypass control circuit 103.

To be more specific, when the transmission power value is equal to or greater than a given threshold, power amplifier 14 is operated in saturation mode. In this case, the power supply voltage of power amplifier 14 is changed according to transmission power by making power control section 13 transmit to mixer 12 the scaling coefficient according to transmission power, and the RF phase signal that bypasses amplitude adjustment circuit 16 (the RF phase signal via bypass circuit 101) is inputted to power amplifier 14 by making bypass control circuit 103 control switch 102 on and switch 104 on. By this means, the RF phase signal is inputted to power amplifier 14 without entering amplitude adjustment circuit 16 including the variable attenuator, that is, the RF phase signal maintaining good C/N ratio is inputted to power amplifier 14.

By contrast, when the transmission power value is less than the given threshold, power amplifier 14 is operated in non-saturation mode. In this case, power control section 13 controls mixer 12 such that fixed power is supplied from mixer 12 to power amplifier 14. Further, power control section 13 receives the amplitude signal inputted from amplitude signal and phase signal forming section 11, and transmits the amplitude signal and a control signal according to transmission power. This amplitude adjustment circuit 16 gives to the RF phase signal the instantaneous amplitude variation according to the amplitude signal and the average power variation according to transmission power. In addition, by making bypass control circuit 103 controls switch 104 on and switch 102 off, the RF phase signal subjected to amplitude adjustment in amplitude adjustment circuit 16 is inputted to power amplifier 14.

By performing this operation, in non-saturation mode, the RF phase signal is inputted to power amplifier 14 via amplitude adjustment circuit 16, that is, the RF phase signal with degraded C/N ratio is inputted to power amplifier 14. However, transmission power is low in non-saturation mode, and, similarly, the level of noise leaking into the receiving terminal of receiving apparatus 110 becomes lower, so that there are no problems.

By contrast, transmission power is high in saturation mode, and, if the C/N ratio of the RF phase signal to be inputted to power amplifier 14 is degraded, the level of noise leaking into the receiving terminal of receiving apparatus 110 becomes higher, thereby making receiving band noise higher. However, in transmission apparatus 100 according to the present embodiment, the RF phase signal is inputted to power amplifier 14 via bypass circuit 101 in saturation mode, that is, the RF phase signal maintaining good C/N ratio is inputted to power amplifier 14, so that it is possible to control the receiving band noise equal to or less than the desired level.

As described above, the transmission apparatus according to the present embodiment has bypass circuit 101 and bypass control circuit 103, and is configured such that the RF phase signal is inputted to power amplifier 14 via amplitude adjustment circuit 16 when power amplifier 14 is operated in non-saturation mode, and that the RF phase signal is inputted to power amplifier 14 via bypass circuit 101 when power amplifier 14 is operated in saturation mode. By this means, transmission apparatus 100 and communication apparatus 200 can be realized such that a wide transmission power control dynamic range required in the W-CDMA scheme can be satisfied while the receiving band noise characteristics in receiving apparatus 110 can be maintained in good condition.

By the way, as a method of improving only the C/N ratio of the RF phase signal to be outputted from amplitude adjustment circuit 16 while bypass circuit 101 according to the present embodiment is not provided, a filter may be provided in a subsequent stage of amplitude adjustment circuit 16. However, if a multiband transmission apparatus employs this configuration, a plurality of filters need to be provided, and the configuration will be complicated compared to the present embodiment.

Here, although a case has been described above with the present embodiment where the present invention is applied to a polar modulation transmission apparatus, the present invention is not limited thereto and is widely applicable to a transmission apparatus that has a power amplifier to amplify the power of transmission signals and that can switch the operation mode of the power amplifier between saturation mode and non-saturation mode.

Embodiment 2

In the configuration of FIG. 3, when switch 102 is controlled off, isolation needs to be maintained quite wider than the variable range of amplitude adjustment circuit 16. In an analog switch comprised of a transfer gate, which is well-known as he switch for an analog circuit, isolation characteristics are not good when the analog switch is controlled off. If isolation characteristics are poor, quality of the transmission signal is degraded by the signal leakage from connection point P1 to P2 when bypass circuit 101 is controlled off. The present embodiment focuses on the above points.

Figure 5:
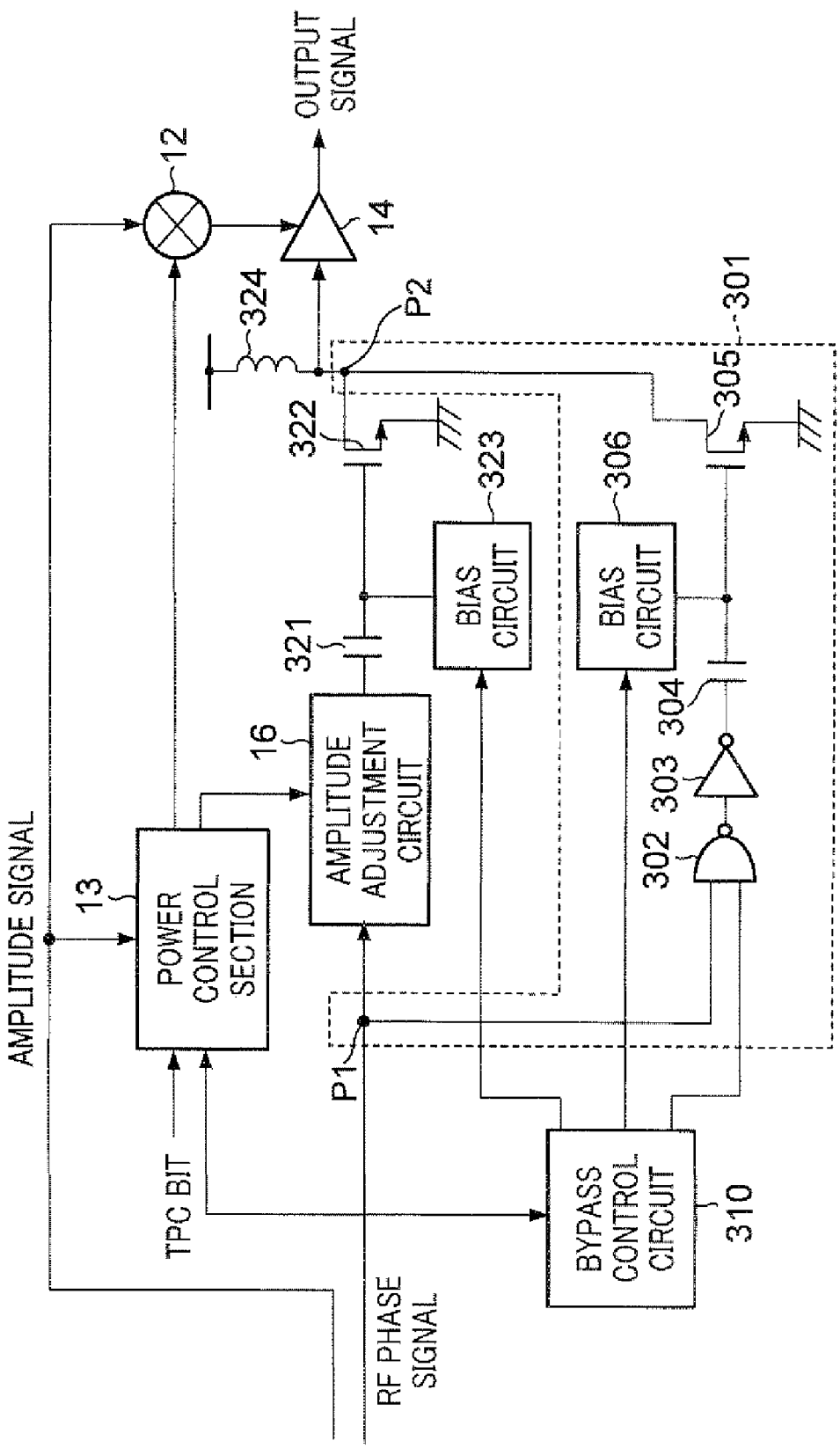
FIG. 5 is a block diagram showing a configuration of a transmission apparatus according to Embodiment 2.

FIG. 5, in which the same components as in FIG. 3 are assigned the same reference numerals, illustrates the configuration of the transmission apparatus according to Embodiment 2. In transmission apparatus 300, the configuration of bypass circuit 301 is mainly different from bypass circuit 101 of FIG. 3. Bypass circuit 301 of the present embodiment has a logic circuit. By this means, compared to the case where bypass circuit 301 is comprised of switches such as transfer gates, it is possible to yield excellent isolation characteristics.

Actually, bypass circuit 301 is provided including capacitor 304, transistor 305 and bias circuit 306, such that these circuits realize the function of switch 102 of FIG. 3. Further, capacitor 321, transistor 322 and bias circuit 323 are connected in a subsequent stage of amplitude adjustment circuit 16, such that these circuits realize the function of switch 104 of FIG. 3.

That is, with the present embodiment, by controlling bias circuit 306 of transistor 305 and bias circuit 323 of transistor 322 on and off, bypass control circuit 310 has a similar function to controlling switches 102 and 104 of FIG. 3 on and off. To be more specific, when bypass control circuit 310 controls bypass circuit 301 on, bypass control circuit 310 controls bypass circuit 306 such that the bias voltage at which the operation of transistor 305 is turned on, is supplied from bias circuit 306 to transistor 305. In this case, bypass control circuit 310 controls bias circuit 323 such that the bias voltage at which transistor 322 is turned off (for example, 0 volt), is supplied from bias circuit 323 to transistor 322. By contrast, when bypass circuit 301 is controlled off, bypass control circuit 310 controls bias circuit 306 such that the bias voltage at which transistor 305 is turned off (for example, 0 volt), is supplied from bias circuit 306 to transistor 305. In this case, bypass control circuit 310 controls bias circuit 323 such that the bias voltage at which transistor 322 is turned off, is supplied from bias circuit 323 to transistor 322. Here, source grounding amplifiers are configured by combining transistors 305 and 322 and inductor 324.

In addition to the above-described configuration, bypass circuit 301 has NAND circuit 302 and inverter circuit 303, so that isolation is maintained between these circuits when bypass circuit 301 is controlled off. That is, the signal leakage from connection point 1 to 2 is prevented when bypass circuit 301 is controlled off.

Details will be explained below. NAND circuit 302 and inverter circuit 303 maintain isolation when transistor 305 is turned off. The RF phase signal and the mode control signal outputted from bypass circuit 310 are inputted to NAND circuit 302. In saturation mode, the RF phase signal is transmitted to inverter circuit 303 via NAND circuit 302. By contrast, in non-saturation mode, by gating the RF phase signal in NAND circuit 302, the output of NAND circuit 302 is fixed to H (High) level. Further, the output is inputted to inverter circuit 303, and the output of inverter circuit 303 is fixed to L (Low) level. As described above, in non-saturation mode, impedance of the output of NAND circuit 302 and impedance of the output of inverter circuit 303 become significantly low, so that it is possible to yield excellent isolation characteristics compared to other switches such as transfer gates. In addition, the configuration of the bypass circuit according to the present embodiment is not limited to the above-described configuration if the logic circuit can yield the above-described effect.

As described above, according to the present embodiment, bypass circuit 301 employs a configuration having a logic circuit, and, sequentially, the signal leakage can be prevented reliably between the input and the output in bypass circuit 301 when bypass circuit 301 is controlled off, so that, in addition to the effect of Embodiment 1, it is possible to reduce degradation of transmission signal quality in non-saturation mode.

By the way, information of an RF phase signal is represented by the phase component, so that it is possible to employ a square wave. Therefore, it is possible to use a logic circuit such as NAND circuit and inverter circuit. The polar modulation is used, and, sequentially, the configuration according to the present embodiment can be realized.

Further, a plurality stages of inverter circuits 303 may be provided. By this means, it is possible to improve isolation characteristics further.

Figure 6:
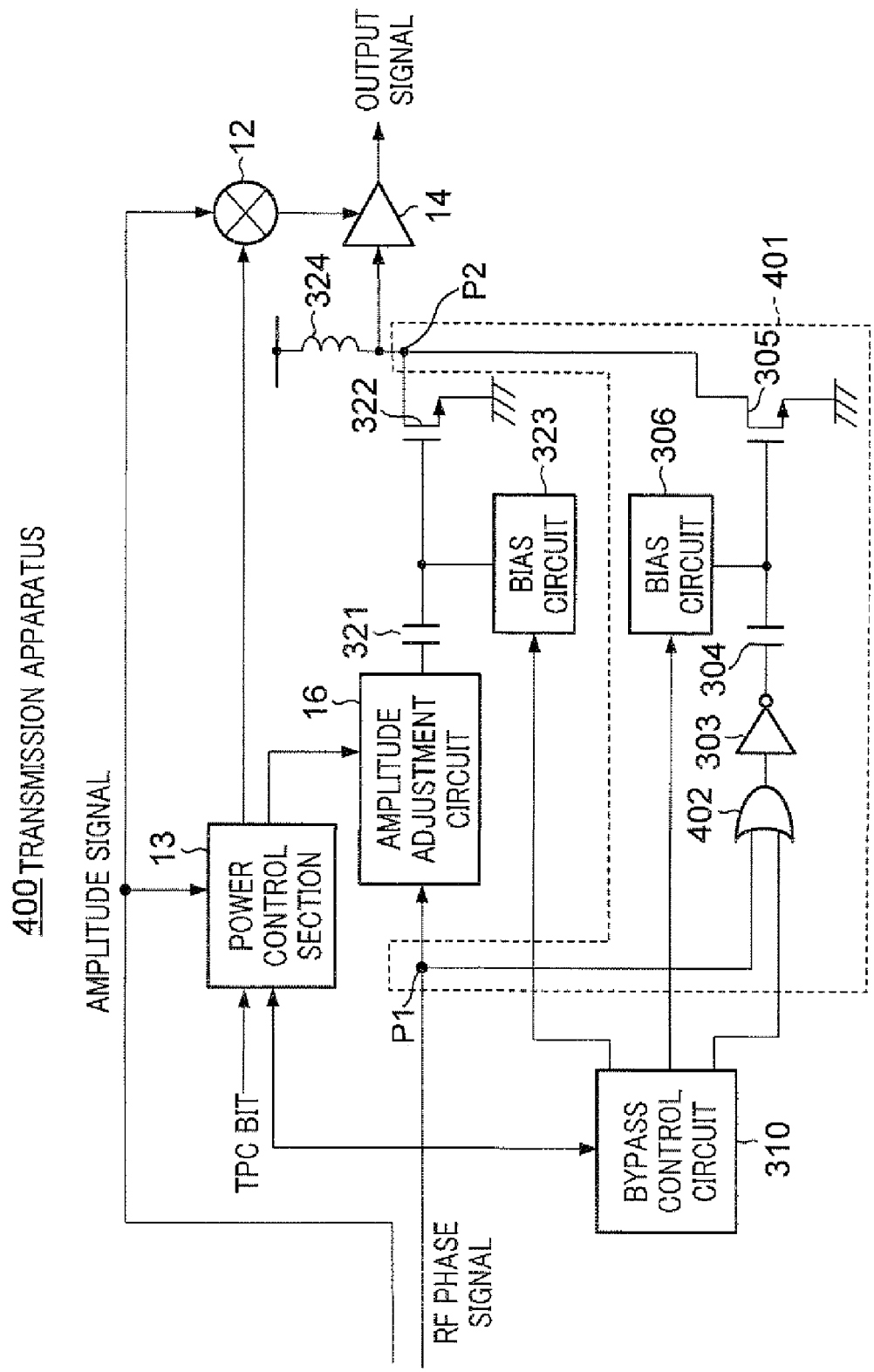
FIG. 6 is a block diagram showing a configuration of a transmission apparatus according to Embodiment 2.

Although a case has been described with FIG. 5 where the logic circuit provided in a bypass circuit is comprised of NAND circuit 302 and inverter circuit 303, the present embodiment is not limited thereto. For example, as shown in FIG. 6, OR circuit 402 can be used instead of NAND circuit 302. In this case, the same effect as in FIG. 5 can be yielded.

Embodiment 3

Figure 7:
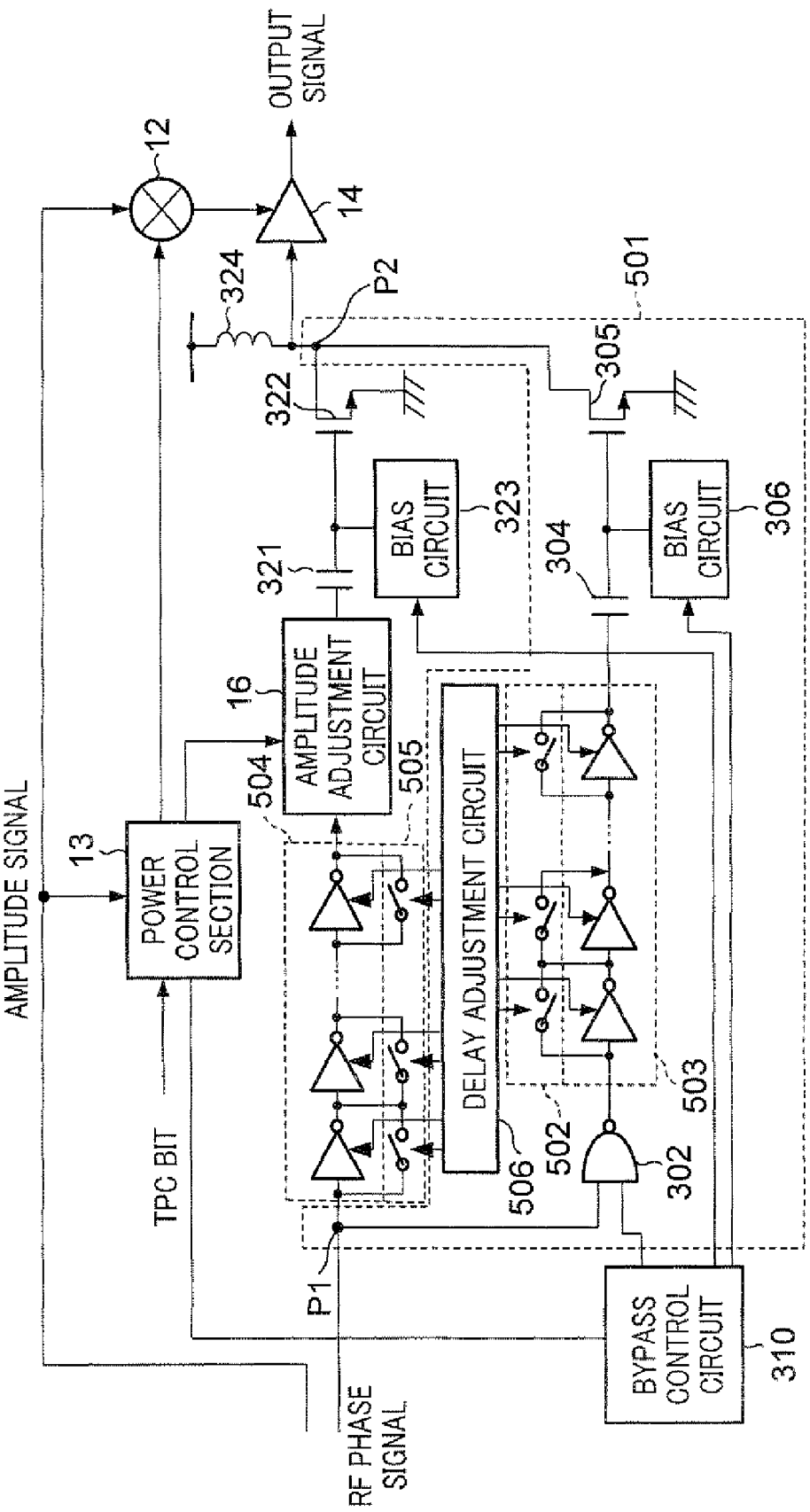
FIG. 7 is a block diagram showing a configuration of a transmission apparatus according to Embodiment 3.

FIG. 7, in which the same components as in FIG. 5 are assigned the same reference numerals, illustrates the configuration of the transmission apparatus according to Embodiment 3. Bypass circuit 501 of transmission apparatus 500 has a plurality stages of tristate inverter circuits 503 and switches 502. Further, transmission apparatus 500 provides a plurality stages of tristate inverter circuits 504 and switches 505 between connection point P1 in bypass circuit 501 and amplitude adjustment circuit 16. Delay adjustment circuit 506 controls switches 502 and 505, so that tristate inverter circuits 503 and 504 perform delay adjustment on the RF phase signal inputted thereto and output the RF phase signal subjected to delay adjustment.

Here, in transmission apparatus 500, the RF phase signal is inputted to power amplifier 14 via tristate inverter circuit 503 in saturation mode, and the RF phase signal is inputted to power amplifier 14 via tristate inverter circuit 504 in non-saturation mode.

By the way, the signal line for bypass circuit 501 and the signal line between connection point P1 and connection point P2 via amplitude adjustment circuit 16 are different in the line length, and, as a result, discontinuous points of signal phases may occur upon switch between saturation mode and non-saturation mode.

In transmission apparatus 500 according to the present embodiment, delay adjustment circuit 506 changes the number of stages of tristate inverters 503 and 504 according to the phase discontinuity between saturation mode and non-saturation mode, so that it is possible to reduce the phase discontinuity upon switch between saturation mode and non-saturation mode.

As described above, according to transmission apparatus 500 of the present embodiment, by providing delay adjustment circuit 506 that adjusts the amount of the signal delay in bypass circuit 501 and the amount of the signal delay on the signal line via amplitude adjustment circuit 16 by changing the number of stages of tristate inverter circuits 503 and 506, which does not allow the RF phase signal to pass, and the number of stages of tristate inverter circuits 503 and 504, which allows the RF phase signal to pass, it is possible to reduce phase discontinuity upon switch between saturation mode and non-saturation mode.

In addition, although a case has been described above with the present embodiment where the transmission apparatus has a configuration having tristate inverter circuits 503 and 504, it is equally possible to solve phase discontinuity upon switch between saturation mode and non-saturation mode by eliminating tristate inverter circuits 504 and switches 505 and performing delay adjustment using only tristate inverter circuits 503 and switches 502 of bypass circuit 501.

Embodiment 4

Figure 8:
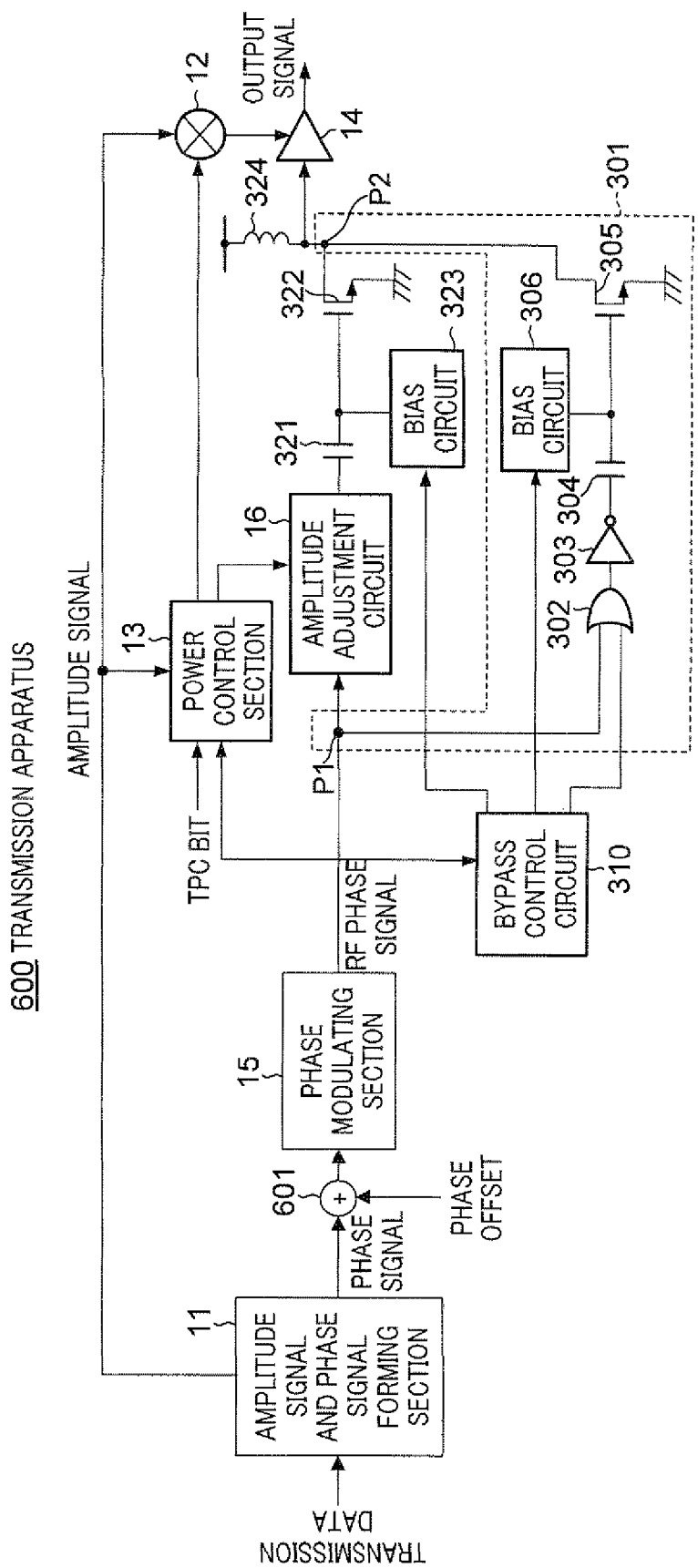
FIG. 8 is a block diagram showing a configuration of a transmission apparatus according to Embodiment 4.

FIG. 8, in which the same components as in FIGS. 3 and 5 are assigned the same reference numerals, illustrates the configuration of the transmission apparatus according to Embodiment 4. In transmission apparatus 600 of FIG. 8, transmission data is inputted to amplitude signal and phase signal forming section 11.

Amplitude signal and phase signal forming section 11 forms an amplitude signal and phase signal according to transmission data. Adder 601 adds a phase offset to the phase signal and yields an RF phase signal by performing up-conversion on the phase signal.

By changing the number of phase offsets according to the phase continuity between saturation mode and non-saturation mode, it is possible to reduce phase discontinuity upon switch between saturation mode and non-saturation mode.

The phase is changed in the baseband frequency domain before up-conversion is performed on frequency in phase modulating section 15, and, as a result, there is an advantage of realizing less power consumption than in the configuration of FIG. 1.

What is claimed is:

1. A transmission apparatus having a power amplifier that amplifies power of a transmission signal and capable of switching an operation mode of the power amplifier between saturation mode and non-saturation mode, the transmission apparatus comprising:
   a power supply voltage adjustment circuit that controls power supply voltage supplied to the power amplifier;
   an input signal amplitude adjustment circuit that inputs to a signal input terminal of the power amplifier a first input signal comprising an input signal subjected to amplitude adjustment;
   a bypass circuit that inputs to the signal input terminal of the power amplifier a second input signal bypassing the input signal amplitude adjustment circuit; and
   a bypass control circuit that switches an input for the power amplifier,
   wherein the bypass control circuit inputs the first input signal to the power amplifier when the power amplifier is operated in the non-saturation mode and inputs the second input signal to the power amplifier when the power amplifier is operated in the saturation mode.

2. The transmission apparatus according to claim 1, wherein:
   the first input signal comprises a signal subjected to amplitude adjustment of a phase signal acquired by phase modulation; and
   the second input signal comprises a phase signal subjected to phase modulation.

3. The transmission apparatus according to claim 1, further comprising:
   an amplitude signal and phase signal forming section that forms an amplitude signal and a phase signal from transmission data; and
   a phase modulating section that performs phase modulation on the phase signal, wherein:
   the amplitude signal is inputted to the power supply voltage adjustment circuit; and
   the amplitude signal is amplified and inputted to a power supply terminal of the power amplifier.

4. The transmission apparatus according to claim 1, wherein the bypass circuit comprises a logic circuit and a switching circuit.

5. The transmission apparatus according to claim 4, wherein the logic circuit comprises an inverter circuit and one of a NAND circuit and an OR circuit.

6. The transmission apparatus according to claim 4, wherein the logic circuit comprises a plurality of inverter circuits and one of a NAND circuit and an OR circuit.

7. The transmission apparatus according to claim 1, wherein the bypass circuit comprises:
   a logic circuit;
   a plurality of inverter circuits that are connected subordinately; and
   a delay adjustment control circuit that adjusts the amount of delay of the input signal for the power amplifier by changing the number of stages of inverter circuits through which the input signal passes.

8. The transmission apparatus according to claim 1, further comprising an adder that adds a phase offset to a phase signal according to phase discontinuity between the first input signal and the second input signal.

9. A communication apparatus comprising:
   the transmission apparatus according to claim 1;
   an antenna;
   a receiving apparatus; and
   an antenna duplexer provided between the transmission apparatus and the receiving apparatus.

* * * * *